(12) United States Patent
Yamasaki et al.

(10) Patent No.: US 9,369,024 B2
(45) Date of Patent: *Jun. 14, 2016

(54) ELECTRIC LINEAR MOTION ACTUATOR AND ELECTRIC DISK BRAKE SYSTEM

(75) Inventors: Tatsuya Yamasaki, Iwata (JP); Masaaki Eguchi, Iwata (JP)

(73) Assignee: NTN CORPORATION, Osaka (JP)

( * ) Notice: Subject to any disclaimer, the term of this patent is extended or adjusted under 35 U.S.C. 154(b) by 433 days.

This patent is subject to a terminal disclaimer.

(21) Appl. No.: 13/577,262

(22) PCT Filed: Feb. 14, 2011

(86) PCT No.: PCT/JP2011/053027
§ 371 (c)(1),
(2), (4) Date: Aug. 6, 2012

(87) PCT Pub. No.: WO2011/102313
PCT Pub. Date: Aug. 25, 2011

(65) Prior Publication Data
US 2012/0305344 A1    Dec. 6, 2012

(30) Foreign Application Priority Data

Feb. 18, 2010  (JP) ................................. 2010-033606
Feb. 26, 2010  (JP) ................................. 2010-042104

(51) Int. Cl.
*F16D 65/18*    (2006.01)
*H02K 7/06*    (2006.01)
(Continued)

(52) U.S. Cl.
CPC ... *H02K 7/06* (2013.01); *F16D 65/18* (2013.01); *F16H 25/2252* (2013.01); *F16D 2121/24* (2013.01); *F16D 2125/40* (2013.01); *F16D 2125/48* (2013.01); *Y10T 74/18656* (2015.01)

(58) Field of Classification Search
CPC . F16D 65/18; F16D 2121/24; F16D 2125/40; F16H 25/2252; F16H 13/06; Y10T 74/19795
USPC ............. 188/72.1, 72.3, 72.7, 72.8, 158, 162; 475/149, 150, 154, 156; 74/424.92, 67, 74/424.75
See application file for complete search history.

(56) References Cited

U.S. PATENT DOCUMENTS 511,679 A * 12/1893 Buckley .................... 254/385
3,861,221 A *  1/1975 Stanley ...................... 74/25
(Continued)

FOREIGN PATENT DOCUMENTS

JP    6-327190    11/1994
JP    09-250579    9/1997
(Continued)

OTHER PUBLICATIONS

A Japanese Office Action, issued Oct. 22, 2013 in Japanese Application No. 2010-042104 (with English translation).
(Continued)

*Primary Examiner* — Anna Momper
*Assistant Examiner* — Stephen Bowes
(74) *Attorney, Agent, or Firm* — Wenderoth, Lind & Ponack, L.L.P.

(57) ABSTRACT

A linear motion actuator has an output member that can be smoothly moved linearly even when lateral moment acts on the output member. A carrier (6) supporting planetary rollers (7) is axially immovable, while an outer ring member (5), as the output member, is axially slidably fitted in the radially inner surface of a cylindrical portion (1*a*) of a housing (1), and is rotationally fixed to a driven member through keys (22). Hard plating layers are formed on the radially outer surface of a rotary shaft (4), the radially outer surfaces of the planetary rollers (7), including helical grooves (7*a*), and the surface of a helical rib member (5*b*) which is fixed to the radially inner surface of the outer ring member (5) forming a helical rib.

19 Claims, 10 Drawing Sheets

(51) Int. Cl.
*F16H 25/22* (2006.01)
*F16D 121/24* (2012.01)
*F16D 125/40* (2012.01)
*F16D 125/48* (2012.01)

(56) References Cited

U.S. PATENT DOCUMENTS

| | | | | |
|---|---|---|---|---|
| 4,435,998 | A * | 3/1984 | Kinoshita | 476/61 |
| 4,804,073 | A * | 2/1989 | Taig et al. | 188/72.1 |
| 6,536,561 | B1 | 3/2003 | Keller | |
| 6,554,109 | B1 * | 4/2003 | Olschewski et al. | 188/72.8 |
| 8,109,370 | B2 * | 2/2012 | Yamasaki | 188/72.1 |
| 8,579,090 | B2 * | 11/2013 | Yamasaki | 188/72.8 |
| 2004/0097325 | A1 * | 5/2004 | Kolstrup | 475/331 |
| 2004/0116218 | A1 * | 6/2004 | Butsch et al. | 474/8 |
| 2009/0095579 | A1 * | 4/2009 | Yamasaki | 188/72.7 |
| 2012/0073393 | A1 | 3/2012 | Yamasaki | |

FOREIGN PATENT DOCUMENTS

| | | |
|---|---|---|
| JP | 2003-343620 | 12/2003 |
| JP | 2004-150533 | 5/2004 |
| JP | 2007-032717 | 2/2007 |
| JP | 2007-037305 | 2/2007 |
| JP | 2008-267457 | 11/2008 |
| JP | 2009-041579 | 2/2009 |
| JP | 2009-041581 | 2/2009 |
| JP | 2009-236210 | 10/2009 |
| WO | 2009/020062 | 2/2009 |

OTHER PUBLICATIONS

English translation of the Written Opinion of the International Searching Authority issued Apr. 26, 2011 in PCT/JP2011/053027.
International Search Report issued Apr. 26, 2011 in International (PCT) Application No. PCT/JP2011/053027.
Chinese Office Action (with partial English translation) issued May 8, 2014 in CN 201180009591.3 which corresponds to the present application.

* cited by examiner

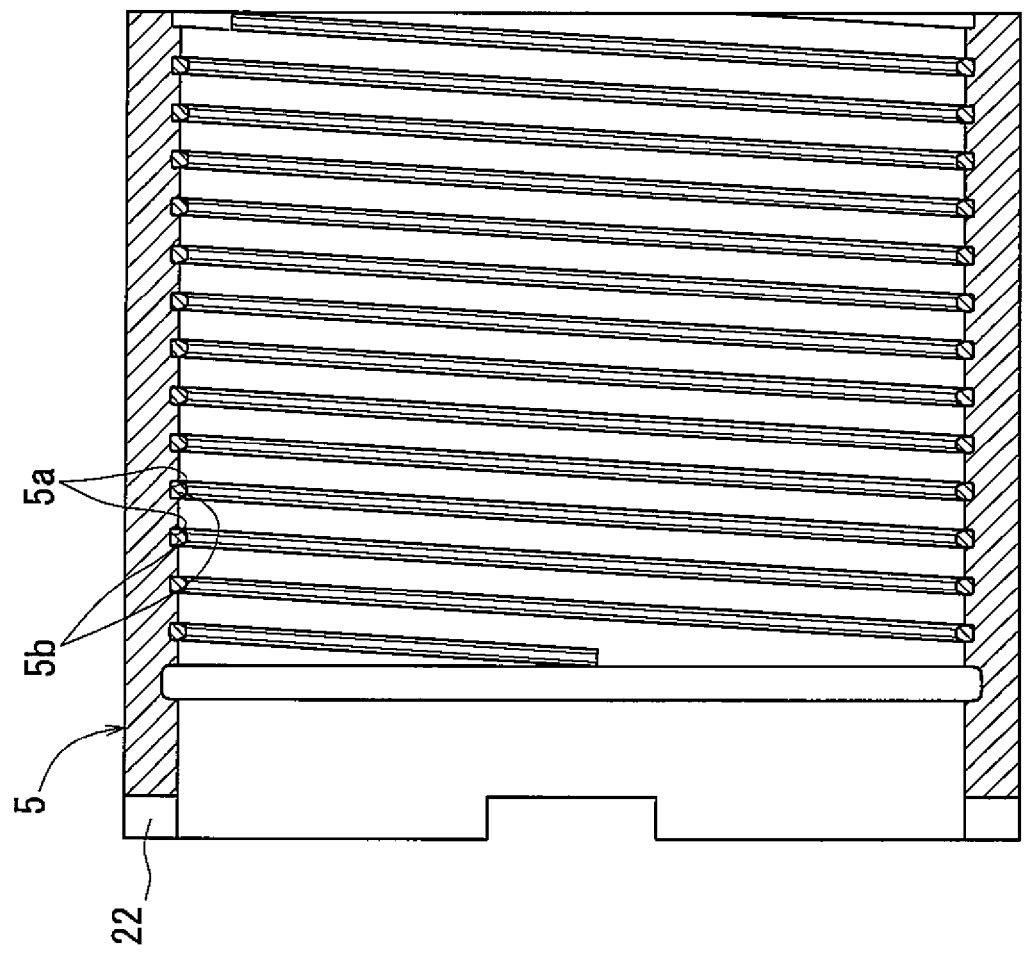
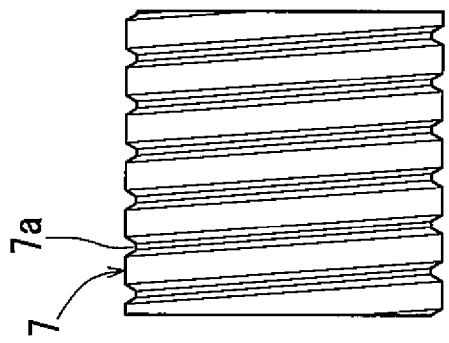

ELECTRIC LINEAR MOTION ACTUATOR
AND ELECTRIC DISK BRAKE SYSTEM

TECHNICAL FIELD

This invention relates to an electric linear motion actuator for converting the rotary motion of an electric motor to a linear motion and linearly driving a member to be driven, and an electric disk brake system using such an electric linear motion actuator.

BACKGROUND ART

Typically, a conventional electric linear motion actuator of this type includes a ball screw mechanism or a ball-ramp mechanism as a motion converter for converting rotary motion to linear motion.

Ball screw mechanisms and ball-ramp mechanisms used in such electric linear motion actuators convert rotary motion to linear motion utilizing a thread having a lead angle, and inclined cam surfaces, respectively, such that they can increase power to a certain extent. But these mechanisms cannot increase power to an extent required in an electric disk brake system.

Electric linear motion actuators including such a motion converter further include a speed reducer such as a planetary gear speed reducer to increase power, as disclosed in JP Patent publication 6-327190A. Such actuators tend to be large in size because they include an additional speed reducer.

The inventors of the present invention proposed, in JP Patent publication 2007-32717A and JP Patent publication 2007-37305A, electric linear motion actuators which can sufficiently increase power without using an additional speed reducer and which is suitable for use in an electric disk brake system, of which the linear motion stroke is relatively small.

The electric linear motion actuator disclosed in JP Patent publication 2007-32717A includes a housing, an outer ring member mounted in the housing, a rotary shaft extending along the center axis of the outer ring member and rotated by an electric motor, a carrier rotatable about the rotary shaft, and planetary rollers rotatably supported by the carrier between the radially outer surface of the rotary shaft and the radially inner surface of the outer ring member. A helical rib is formed on the radially inner surface of the outer member which is engaged in a plurality of circumferential grooves formed on the radially outer surface of each planetary roller at a pitch equal to the pitch of the helical rib. When the rotary shaft is rotated, the planetary rollers, which are in frictional contact with the rotary shaft, rotate about the center axes of the respective planetary rollers while revolving around the rotary shaft. This causes the carrier to move in one axial direction due to the engagement of the helical rib in the circumferential grooves. Thus, the carrier acts as an output member for linearly moving a member to be driven. The actuator disclosed in JP Patent publication 2007-37305A differs from the actuator disclosed in JP Patent publication 2007-32717A in that instead of the plurality of circumferential grooves, a helical groove is formed on each planetary roller.

Many of vehicle brake systems are hydraulic ones. But with an increase in sophisticated brake control schemes such as antilock brake control systems (ABS), electric disk brake systems are gathering attention these days because electric brake systems need no complicated hydraulic circuits.

As disclosed in JP Patent publication 2003-343620A, an electric disk brake system includes an electric motor, an electric linear motion actuator of the above-described type which is mounted in a caliper body, a member to be driven, and a member to be braked. When a brake pedal is depressed, the motor is actuated based on e.g. a signal, so that the linear motion actuator moves the member to be driven to press the driven member against the member to be braked, thereby applying a braking force to the member to be braked.

The electric linear motion actuators disclosed in JP Patent publication 2007-32717A and JP Patent publication 2007-37305A can sufficiently increase power without the need for an additional speed reducer and thus are compact in size. But since the carrier, which is linearly moved, is relatively short in axial dimension, if this type of electric linear motion actuator is used e.g. in an electric brake system, a tangential force applied to the braking member (driven member) from the member to be braked partially acts on the carrier as a lateral moment, making it difficult to smoothly and linearly move the carrier and the braking member.

After repeated use of this type of electric linear motion actuator, the radially outer surfaces of the rotary shaft and the planetary rollers as well as the radially inner surface of the outer ring member gradually become worn. When they become worn and the gaps between these members grow, the planetary rollers tend to incline in radial directions or incline in the circumferential direction (skew) while they are rotating about their axes and also revolving around the rotary shaft.

When the planetary rollers incline in radial directions or in the circumferential direction, the helical rib tends to be unevenly brought into contact with the circumferential grooves or the helical grooves, producing locally excessive loads on the contact portions between the helical rib and the circumferential grooves or helical grooves, which could partially break the helical rib or the circumferential grooves or helical grooves.

If the helical rib of the outer ring member and/or the circumferential grooves or helical grooves of the planetary rollers become worn, the contact pressure may become excessive between some turns of the helical rib and the circumferential grooves or helical grooves due to uneven contact therebetween, which could cause seizure and/or chipping at the contact portions.

Also, with this type of electric linear motion actuators, since the helical rib on the radially inner surface of the outer ring member has a different lead angle from the circumferential grooves or helical groove on the radially outer surface of each planetary roller, when the helical rib engages in the circumferential grooves or helical groove of each planetary roller with the radially outer surface of each planetary roller in rolling contact with the radially inner surface of the outer ring member, the shoulders of the helical rib tends to contact the edges of the grooves. The torque loss resulting from the contact resistance between the shoulders and edges reduces the efficiency of conversion to linear motion. The contact between the shoulders and edges could also cause wear of, or damage to, the shoulders and/or edges.

SUMMARY

An object of the present invention is to allow smooth linear motion of the output member even when a lateral moment acts on the output member, to prevent wear of the radially outer surfaces of the planetary rollers and the radially inner surface of the outer ring member, and to prevent the shoulders of the helical rib from contacting the edges of the circumferential grooves or helical grooves when the helical rib is engaged in the circumferential grooves or helical grooves.

In order to achieve this object, the present invention provides an electric linear motion actuator comprising a housing, an outer ring member mounted in the housing and having a center axis, a rotary shaft extending along the center axis of the outer ring member and configured to be driven by an electric motor, a carrier rotatable about the rotary shaft, and a plurality of planetary rollers rotatably supported on the carrier between a radially outer surface of the rotary shaft and a radially inner surface of the outer ring member, wherein the radially inner surface of the outer ring member is formed with at least one helical rib, the planetary rollers each having a radially outer surface formed with a plurality of circumferential grooves which are equal in pitch to the helical rib or formed with at least one helical groove equal in pitch to, and different in lead angle from, the helical rib, the helical rib being engaged in the circumferential grooves or the helical grooves of the respective planetary rollers, and wherein the outer ring member and the carrier are configured to be movable in the direction of the center axis relative to each other, wherein the carrier is immovable in the direction of the center axis of the outer ring member, and the outer ring member is not rotatable and fitted in a radially inner surface of the housing so as to be slidable in the direction of the center axis of the outer ring member, and wherein the outer ring member acts as a linearly movable output member.

In this arrangement, in which the carrier is immovable in the direction of the center axis of the outer ring member, and the outer ring member is not rotatable and fitted in a radially inner surface of the housing so as to be slidable in the direction of the center axis of the outer ring member so that the outer ring member acts as a linearly movable output member, the outer ring member as the output member is guided by the radially inner surface of the housing over its axially long area, so that even when a lateral moment acts on the output member while the output member is moving linearly, the output member can be smoothly moved linearly.

To prevent wear of the radially outer surfaces of the rotary shaft and the planetary rollers and the radially inner surface of the outer ring member, at least one of the radially outer surface of the rotary shaft, the radially outer surface of each of the planetary rollers and the radially inner surface of the outer ring member is preferably subjected to surface hardening treatment.

The helical rib may comprise a helical rib member fitted in a helical groove formed in the radially inner surface of the outer ring member. Such a helical rib can be formed easily and accurately.

When the helical rib is formed by engaging the helical rib member in the helical groove, a guide surface may be provided for guiding the top surface of the helical rib to prevent separation of the helical rib member from the helical groove. Such a guide surface may be formed on the carrier, which support the planetary rollers, or on a separate guide member fixed to the carrier.

At least either the surface of the helical rib on the radially inner surface of the outer ring member or the circumferential grooves or the helical groove on the radially outer surface of each of the planetary rollers may be subjected to surface hardening treatment, in order to prevent seizure or chipping of the helical rib or the circumferential or helical grooves, in which the helical rib is engaged.

The surface hardening treatment may be hard plating treatment. The hard plating treatment may be hard Cr plating, Ni—B plating or Ni—P plating.

The member or members subjected to such surface hardening treatment may be made of low carbon steel which contains carbon by 0.3% by mass or less and subjected to carburizing treatment, in order to improve their wear resistance.

For the same purpose, the member or members subjected to such surface hardening treatment may be made of medium carbon steel containing carbon by more than 0.3% by mass and subjected to hardening and tempering.

The at least one helical rib may comprise a plurality of helical ribs, and/or the at least one helical groove formed on the radially outer surface of each of the planetary rollers may comprise a plurality of helical grooves so that the difference in lead angle between the helical rib or ribs and the helical groove or grooves can be determined more freely.

By setting the equivalent lead angle α expressed by the below equation (1) at 0.5° or less, preferably 0.3° or less, it is possible to prevent the planetary rollers from revolving around the rotary shaft in the opposite direction and the outer ring member from being pushed back due to slipping between the helical rib of the outer ring member and the circumferential or helical grooves of the planetary rollers under axial loads.

[Equation 1]

$$\alpha = \tan^{-1}\left\{\frac{D_o \cdot \tan|\alpha_o - \alpha_p|}{D_o + D_s}\right\} \quad (1)$$

The equivalent lead angle α is determined at 0.5° or less based on experiments. If the lubrication between the helical rib and the circumferential or helical grooves is good, the equivalent angle should be 0.3° or less.

The tangent of the equivalent angle α is the axial moving distance X of the outer ring member relative to the angular displacement of the radially outer surface of the rotary shaft, and is given by the following equation 2:

[Equation 2]

$$\tan\alpha = \frac{2X}{D_s \cdot \theta_s} \quad (2)$$

where $D_S$ is the external diameter of the rotary shaft, $\theta_S$ is rotational angle of the rotary shaft. Thus, $D_S \cdot \theta_S$ is the angular displacement of the radially outer surface of the rotary shaft.

Since the outer ring member moves axially by the distance X due to the difference between the lead angle $\alpha o$ of the helical rib and the lead angle $\alpha p$ of the circumferential or helical grooves of the planetary rollers (lead angle $\alpha p$ of the circumferential grooves is zero), the distance X is given by the following equation (3):

[Equation 3]

$$X = \frac{D_o \cdot \theta_p}{2} \cdot \tan|\alpha_o - \alpha_p| \quad (3)$$

where Do is the internal diameter of the outer ring member, and θp is the revolving angle of each planetary roller.

The revolving angle θp of each planetary roller is given by the following equation (4):

[Equation 4]

$$\theta_p = \left(\frac{D_s}{D_o + D_s}\right) \cdot \theta_s \quad (4)$$

Equation 4 is equivalent to an equation of the velocity transmission ratio in a planetary speed reducer. Equation (1) is obtained by substituting equation (4) for θp in equation (3), substituting equation (3) for X in equation (2), and rearranging equation (2).

Equation (1) corresponds to a lead angle which defines the axial moving distance of a threaded shaft when the threaded shaft is turned. In threadedly engaged members of the type in which axial loads are supported by sliding friction between the inclined thread surfaces, it is known that the upper limit of the lead angle below which the axial loads can be supported is about 3 to 5°, though dependent on the degree of lubrication on the inclined thread surfaces. According to the present invention, in order to reliably support axial loads, the equivalent lead angle α is determined to be on the order of one-tenth of this upper limit and close to the upper limit of the lead angle of the ball-screw. This allows, presumably, the planetary rollers of the linear motion actuator to revolve around the rotary shaft between the rotary shaft and the outer ring member, just like the balls of a ball-screw.

Each of the circumferential grooves or the helical groove on the radially outer surface of each of the planetary rollers preferably has its side walls inclined such that the width of the circumferential or helical groove increases from its bottom toward opening to keep the shoulders of the helical rib on the radially inner surface of the outer ring member out of contact with the edges of the circumferential or helical groove when the former is engaged in the latter. This reduces torque loss due to contact resistance between the rib and the groove, thereby improving the efficiency with which rotary motion is converted to linear motion, and also prevents wear of, and damage to, the shoulders of the helical rib and the edges of the circumferential or helical grooves.

Further, the helical rib may have side surfaces thereof inclined such that the width of the helical rib decreases from a root toward an apex of the helical rib to keep the shoulders of the helical rib out of contact with the inclined side walls of the grooves as well when the helical rib is engaged in the grooves.

Preferably, the side surfaces are inclined at an angle equal to an angle of inclination of the side walls such that the side surfaces of the helical rib are uniformly brought into contact with the side walls of the circumferential or helical grooves when the helical rib is engaged in the grooves, thereby allowing the helical rib to be smoothly and reliably engaged in the circumferential or helical grooves.

At least either the side surfaces or the side walls may be curved surfaces which are convex in a direction in which the respective side surfaces or the side walls are inclined. This prevents the side walls of the helical rib from contacting the side walls of the circumferential grooves or helical grooves at their portions near their roots or apexes when the helical rib is engaged in the circumferential or helical grooves.

The curved surfaces are preferably arcuate surfaces because arcuate surfaces can be formed easily and accurately.

Such arcuate surfaces preferably have a radius of curvature larger than a height of the helical rib so that the side surfaces of the helical rib contact the side walls of the circumferential or helical grooves over a larger area, thereby reducing the contact pressure.

Chamfers are preferably formed along at least either the shoulders of the helical rib or the edges of the circumferential or helical grooves by barreling or cutting. Such chamfers prevent the shoulders of the helical rib from contacting the edges of the grooves when the helical rib is engaged in the grooves. The chamfers also reduce contact pressure between the edges of the circumferential or helical groves of the planetary rollers and radially inner surface of the outer ring member when the former are in rolling contact with the latter.

The chamfers may each comprise a single straight line, a plurality of straight lines, a curved line having a single radius of curvature, or a combination of at least one single straight line and the curved line.

The present invention also provides an electric disk brake system comprising brake pads, a brake disk, and an electric linear motion actuator for linear driving the brake pads, thereby pressing the brake pads against the brake disk and applying a braking force to the disk, wherein the electric linear motion actuator is any of the above-described electric linear motion actuators.

According to the present invention, the carrier of the electric linear motion actuator, which supports the planetary rollers, is axially immovable, while the outer ring member is rotationally fixed and fitted in the radially inner surface of the housing so as to be axially slidable, and driven linearly as an output member. With this arrangement, even when lateral moment acts on the output member while the output member is moving linearly, the output member can be smoothly guided. It is also possible to prevent wear of the radially outer surfaces of the rotary shaft and the planetary rollers and the radially inner surface of the outer ring member, thereby preventing inclination of the planetary rollers in radial and circumferential directions.

The electric disk brake system according to the present invention includes the electric linear motion actuator according to the present invention. The actuator linearly drives the brake pads and presses the brake pads against the brake disk. With this arrangement, when tangential force acts on the brake pads from the brake rotor, lateral moment will act on the output member while the output member is being linearly moved. But for the above-mentioned reason, the outer ring member as the output member can be smoothly guided even when lateral moment acts thereon. It is also possible to prevent wear of the radially outer surfaces of the rotary shaft and the planetary rollers and the radially inner surface of the outer ring member, thereby preventing inclination of the planetary rollers in radial and circumferential directions.

BRIEF DESCRIPTION OF THE DRAWINGS

FIGS. 4A and 4B are front views of an outer ring member and a planetary roller of FIG. 1, showing the helical rib of the outer ring member and the helical groove of the planetary roller, respectively.

DETAILED DESCRIPTION

Figure 1:
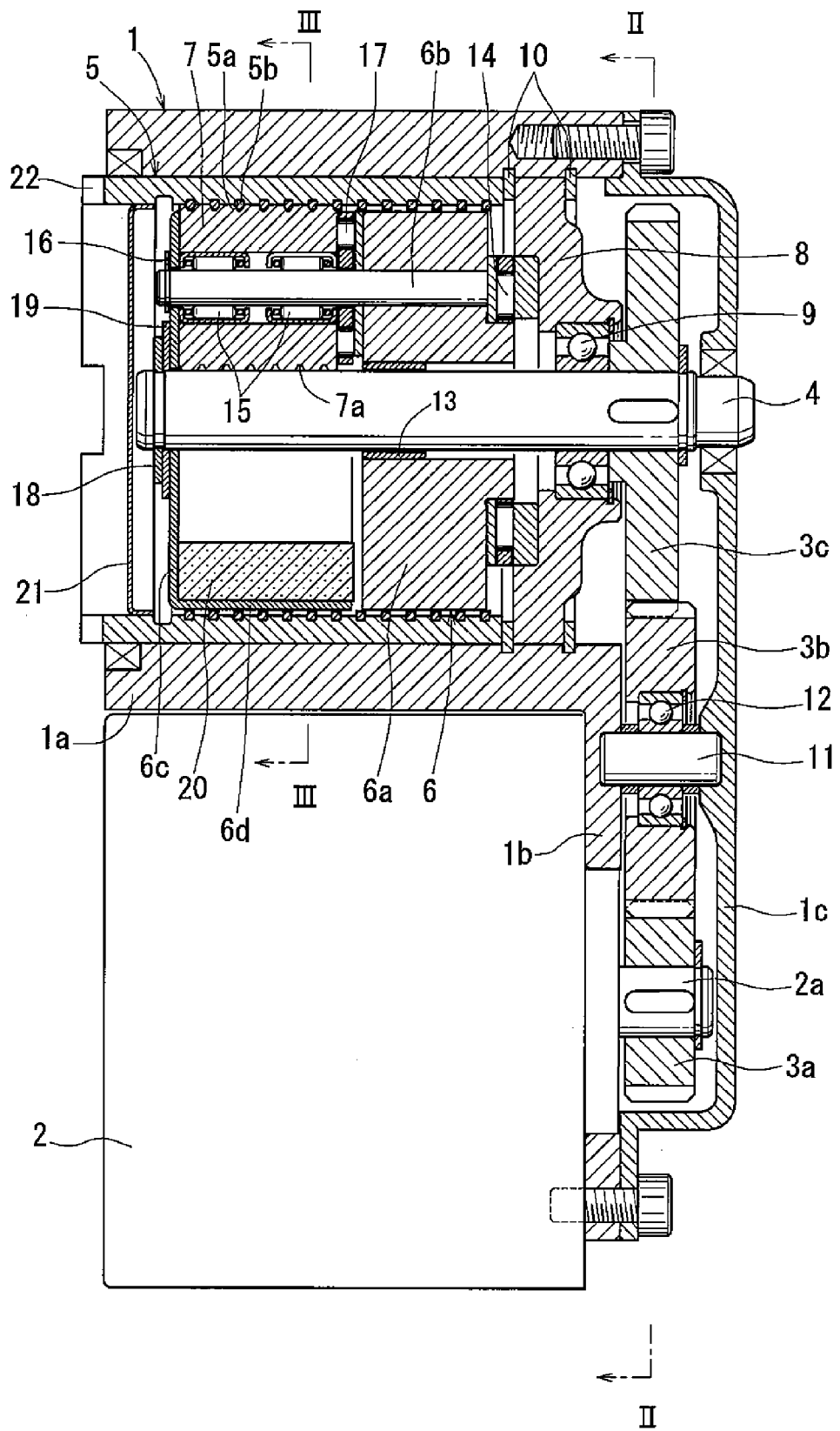
FIG. 1 is vertical sectional view of an electric linear motion actuator embodying the present invention.
Figure 2:
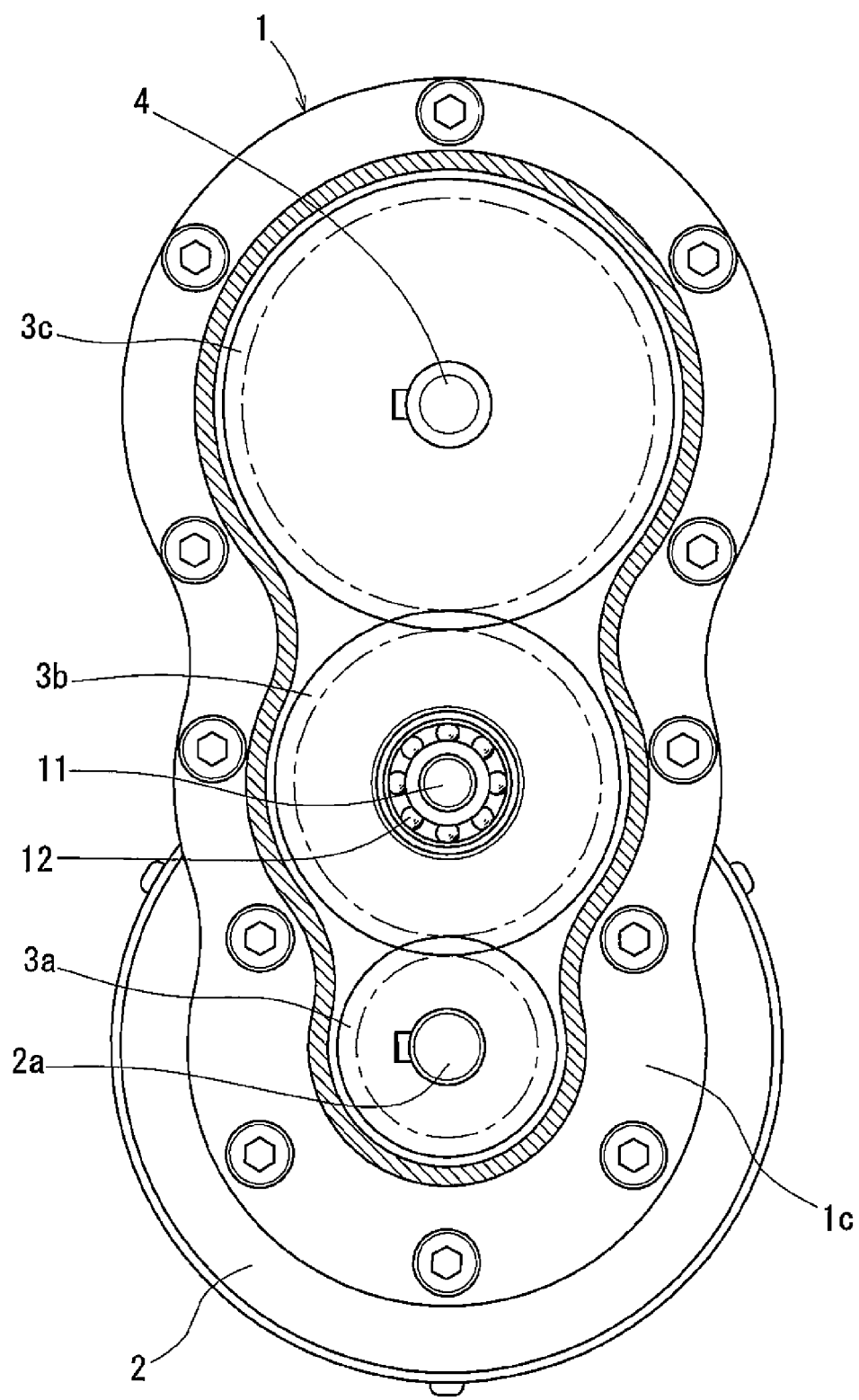
FIG. 2 is a sectional view taken along line II-II of FIG. 1.
Figure 3:
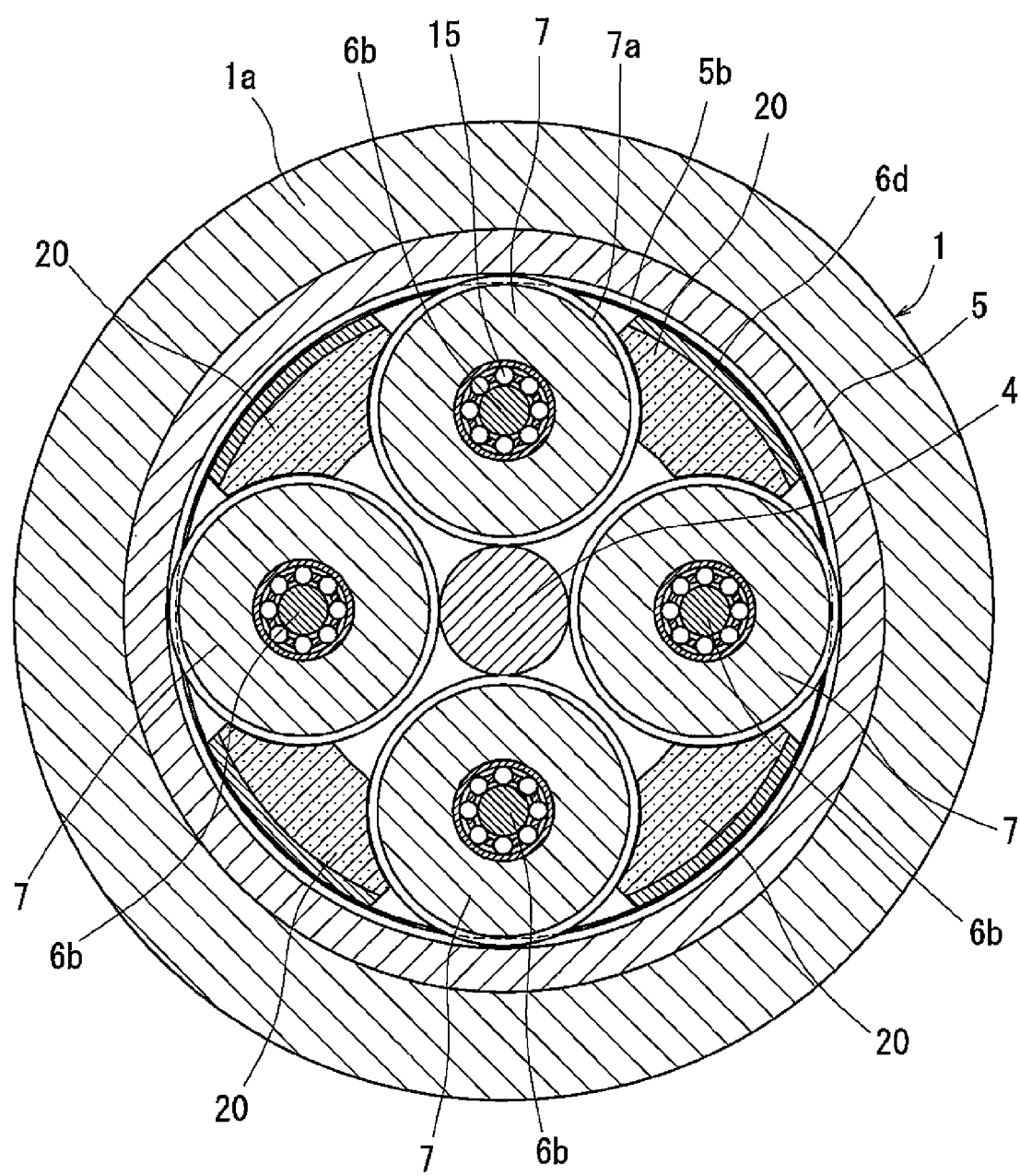
FIG. 3 is a sectional view taken along line III-III of FIG. 1.

Embodiments of the present invention are now described with reference to the drawings. FIGS. 1 to 5 show an electric linear motion actuator embodying the present invention. As shown in FIGS. 1 to 3, the actuator includes a housing 1 having a cylindrical portion 1a, and a flange 1b protruding outwardly in one radial direction from one end of the cylindrical portion 1a. An electric motor 2 is mounted on the flange 1b to extend parallel to the cylindrical portion 1a.

The electric motor 2 has a rotor shaft 2a of which the rotation is transmitted to a rotary shaft 4 extending along the center axis of the cylindrical portion 1a through gears 3a, 3b and 3c. Four planetary rollers 7 are mounted between the rotary shaft 4 and an outer ring member 5 slidably fitted in the radially inner surface of the cylindrical portion 1a. The planetary rollers 7 are individually rotatably supported by a carrier 6. As shown in FIGS. 1 and 3, the outer surfaces of the rollers 7 are engaged against the outer surface of the rotary shaft 4.

A lid 1c is provided at the end of the housing 1 where there is the flange 1b. The gears 3a, 3b and 3c are mounted in a space defined by the lid 1c. A shaft support member 8 is fitted in the cylindrical portion 1a at its portion near the lid 1c. The portion of the rotary shaft 4 near its proximal end, to which the gear 3c is mounted, is supported by the shaft support member 8 through a ball bearing 9.

The shaft support member 8 has both sides thereof fixed to the housing 1 by means of snap rings 10, thus preventing axial movement of the rotary shaft 4 and the carrier 6. The intermediate gear 3b, which meshes with the gear 3a, which is mounted on the rotor shaft 3a, and the gear 3c, is supported on a shaft pin 11 extending between the flange 1b and the lid 1c through a ball bearing 12.

The carrier 6, which supports the planetary rollers 7, includes a carrier body 6a fitted around the rotary shaft 4 through a slide bearing 13 made of a sintered material so as to be rotatable relative to the rotary shaft 4, and kept in abutment with the end surface of the shaft support member 8 through a thrust roller bearing 14. This prevents axial movement of the carrier 6 toward the proximal end of the rotary shaft 4.

The slide bearing 13 may be made of resin, ceramic material, a metal such as an aluminum alloy or a copper alloy, or a composite thereof. The planetary rollers 7 are rotatably supported on support pins 6b of the carrier 6, and are inseparably held in position by a presser plate 6c fixed to the support pins 6b through snap rings 16, respectively, so as to face the end surfaces of the planetary rollers 7 remote from the carrier body 6a. The planetary rollers 7 are supported on the carrier body 6a through thrust roller bearings 17 so as to be rotatable about the respective pins 6b.

A snap ring 18 is fitted on the rotary shaft 4 at its distal end. The presser plate 6c of the carrier 6 is in abutment with the snap ring 18 through a slide bearing 19 made of a sintered material, thus preventing axial movement of the carrier 6 toward the distal end of the rotary shaft 4.

The slide bearing 19 may also be made of resin, ceramic material, a metal such as an aluminum alloy or a copper alloy, or a composite thereof. The presser plate 6c has part-cylindrical portions 6d integral with the main body of the presser plate and extending toward the planetary rollers 7. The part-cylindrical portions 6d carry, on their radially inner surfaces, fan-shaped lubricant applicators 20, respectively, for applying lubricant to the radially outer surfaces of the planetary rollers 7.

The radially outer surfaces of the part-cylindrical portions 6d serve as guide surfaces that guide the radially inner surfaces of two helical ribs of the outer ring member 5 which are formed by rib members 5b. A seal member 21 having a cylindrical outer edge is fitted in the radially inner surface of the outer ring member 5 at one end thereof to separate the interior of the outer ring member, in which the planetary rollers 7 and the lubricant applicators 20 are received, from the outside. The seal member 21 is formed by pressing a steel sheet. But the seal member 21 may be made of resin or rubber instead.

A member to be driven is adapted to be coupled to the frond end of the outer ring member 5 through a key 22 formed on the front end surface of the outer ring member 5 and adapted to rotationally fix the member to be driven to the outer ring member 5. Thus, the outer ring member 5, which is axially slidably fitted in the radially inner surface of the cylindrical portion 1a of the housing 1, serves as an output member axially and linearly movable relative to the carrier 6, which is prevented from moving in either axial direction. The cylindrical portion 1a is open at its end where the member to be driven is adapted to be coupled to the outer ring member 5. The outer ring member 5 is smoothly moved linearly over a long axial range so as to protrude from the cylindrical portion 1a, while being guided by the axially elongated radially inner surface of the cylindrical portion 1a of the outer ring member 5.

As shown in FIG. 4A, the two rib members 5b are fitted in two respective helical grooves 5a formed in the radially inner surface of the outer ring member 5, with which the planetary rollers 7 are kept in rolling contact, to form the two helical ribs on the radially inner surface of the outer ring member 5. The helical ribs 5b have an equivalent lead angle α of not more than 0.3° so that the outer ring member 5 is not pushed back under loads.

As shown in FIG. 4B, each planetary roller 7 has on its radially outer surface a single helical groove 7a in which the helical ribs formed by rib members 5b are engaged. The helical groove 7a is equal in pitch to, and different in lead angle from, the helical ribs. When, due to rotation of the rotary shaft 4 with which they are engaged, the planetary rollers 7 rotate about their respective axes while revolving around the rotary shaft 4 with the helical ribs 5b engaged in the helical grooves 7a, the planetary rollers 7 move axially relative to the outer ring member 5 due to the difference in lead angle between the helical ribs 5b and the helical grooves 7a.

Two helical ribs 5b are formed on the outer ring member 5 so that the difference in lead angle between the helical ribs 5b and the helical grooves 7a can be determined within a wider range. But only a single helical rib 5b may be formed instead. Also, instead of the helical groove 7a, a plurality of circumferential grooves 7a may be formed on each planetary roller at the same pitch as the helical ribs 5b.

Figure 5:
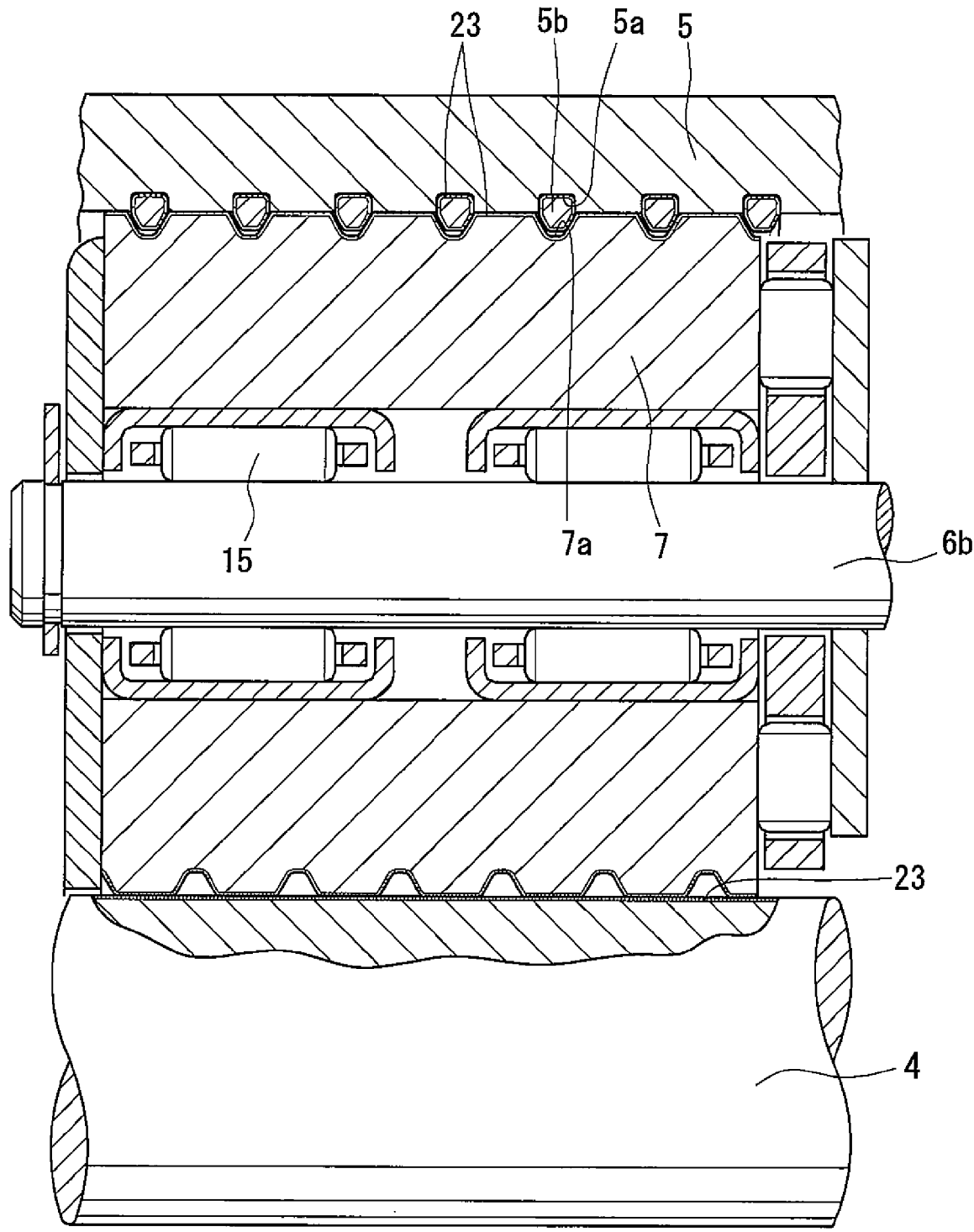
FIG. 5 is an enlarged sectional view of the actuator, showing one of the planetary rollers.

As shown in FIG. 5, the helical grooves 7a on the radially outer surfaces of the planetary rollers 7 have their side walls tapered such that the width of the grooves 7a gradually increases from the bottom to the opening. Correspondingly, the helical ribs 5b on the radially inner surface of the outer ring member 5, which are formed by the rib members 5b, have their side walls tapered, at the same angle as the side walls of the helical grooves 7a, such that the width of the helical ribs 5b gradually decreases from the base to the apex. Thus, when the helical ribs 5b of the outer ring member 5 are engaged in the helical grooves 7a of the planetary rollers 7 while the planetary rollers 7 are in rolling contact with the radially inner surface of the outer ring member 5, the shoulders of the helical ribs 5b are kept out of contact with the edges of the helical grooves 7a.

The rotary shaft 4, the rib members 5b forming the helical ribs, and the planetary rollers 7 are made of a low carbon steel, of which the carbon content is not more than 0.3% by mass, and subjected to carburizing. The radially outer surface of the rotary shaft 4, the surfaces of the rib members 5b, and the radially outer surfaces of the planetary rollers 7, including the helical grooves 7a, are subjected to surface hardening treatment. In particular, hard plating layers 23 in the form of chrome plating layers are formed on these surfaces. Hard plating layers may be Ni—B plating or Ni—P plating layers instead.

Figure 6:
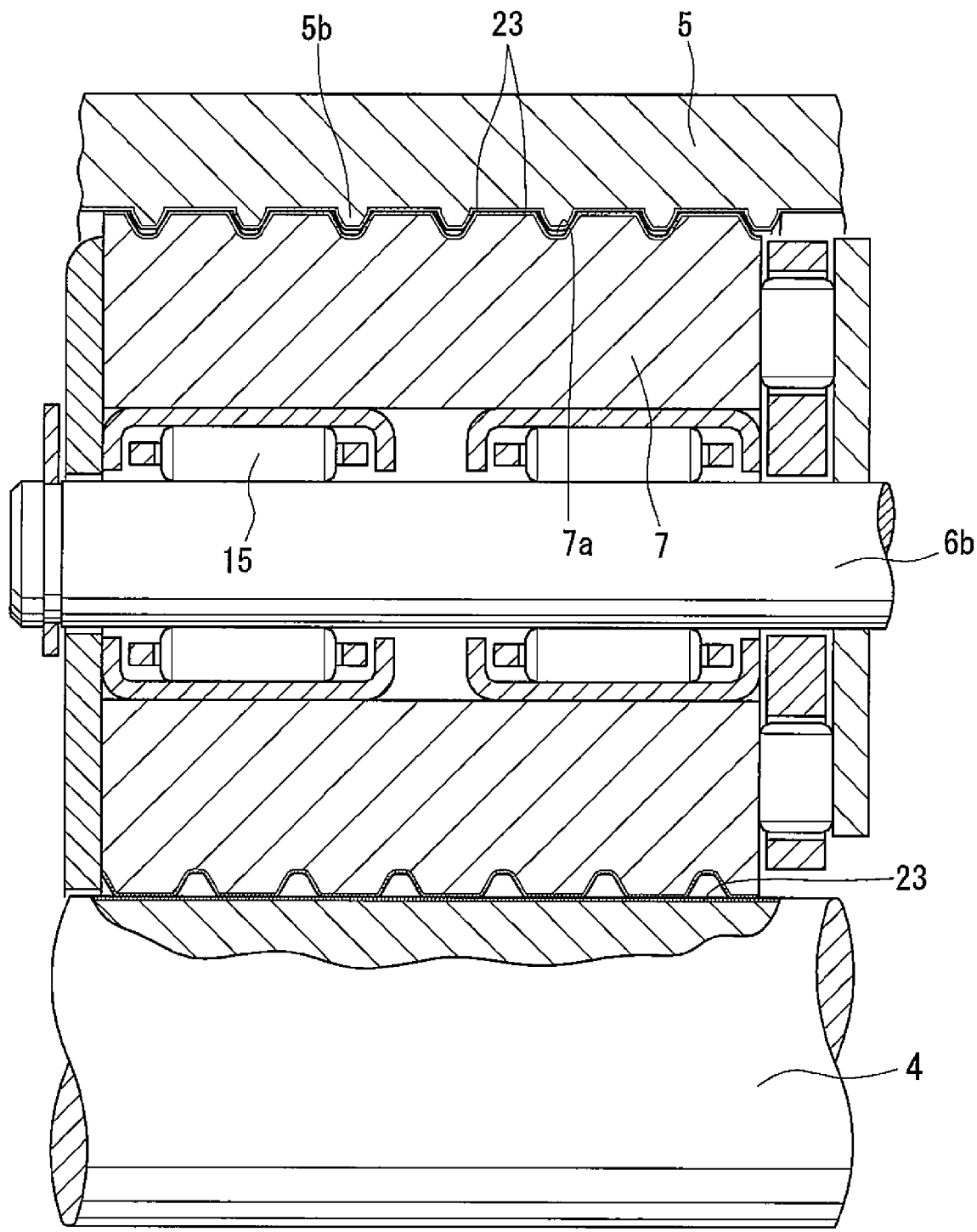
FIG. 6 is a sectional view of a modification of FIG. 5.

FIG. 6 shows a modification of the helical ribs 5b of the outer ring member 5 shown in FIG. 5. The helical ribs 5b of FIG. 6 are integral with the outer ring member 5. The rotary shaft 4, the outer ring member 5, and the planetary rollers 7 are made of a medium carbon steel, of which the carbon content is higher than 0.3% by mass, and subjected to hardening and tempering. Hard plating layers 23 in the form of chrome plating layers are formed on the radially outer surface of the rotary shaft 4, the radially inner surface of the outer ring member 5, including the surfaces of the rib members 5b, and the radially outer surfaces of the planetary rollers 7, including the helical grooves 7a.

Figure 10:
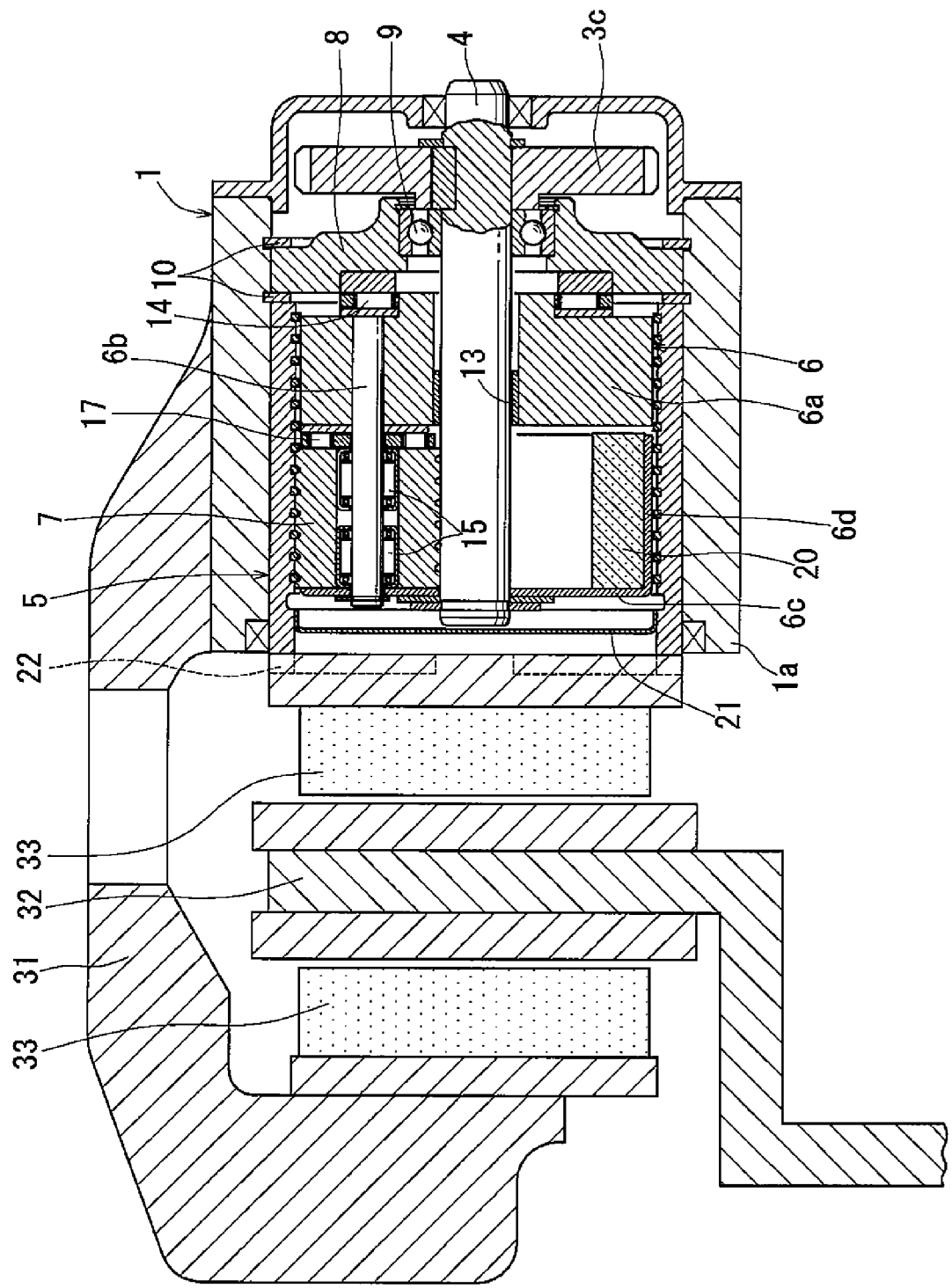
FIG. 10 is a vertical sectional view of an electric disk brake system according to the present invention.

FIG. 10 shows an electric disk brake system which uses the above-described electric linear motion actuator. This disk brake system includes a caliper body 31, a disk rotor 32 as a member to be braked, and brake pads 33 as braking members facing the respective sides of the disk rotor 32 in the caliper body 31. The housing 1 of the electric linear motion actuator is fixed to the caliper body 31. The outer ring member 5, as a linear motion output member, is rotationally fixed to one of the brake pads 33 as a driven member by keys 22, so that the brake pads 33 can be pressed against the disk rotor 32. FIG. 10 shows a section of the electric linear motion actuator that is perpendicular to the section of FIG. 1.

In this embodiment, surface hardening treatment is performed on all of the radially outer surface of the rotary shaft 4, the radially outer surfaces of the planetary rollers 7, and the helical ribs 5b on the radially inner surface of the outer ring member 5. But such surface hardening treatment may be performed on not all, but only some of these surfaces.

Figure 7:
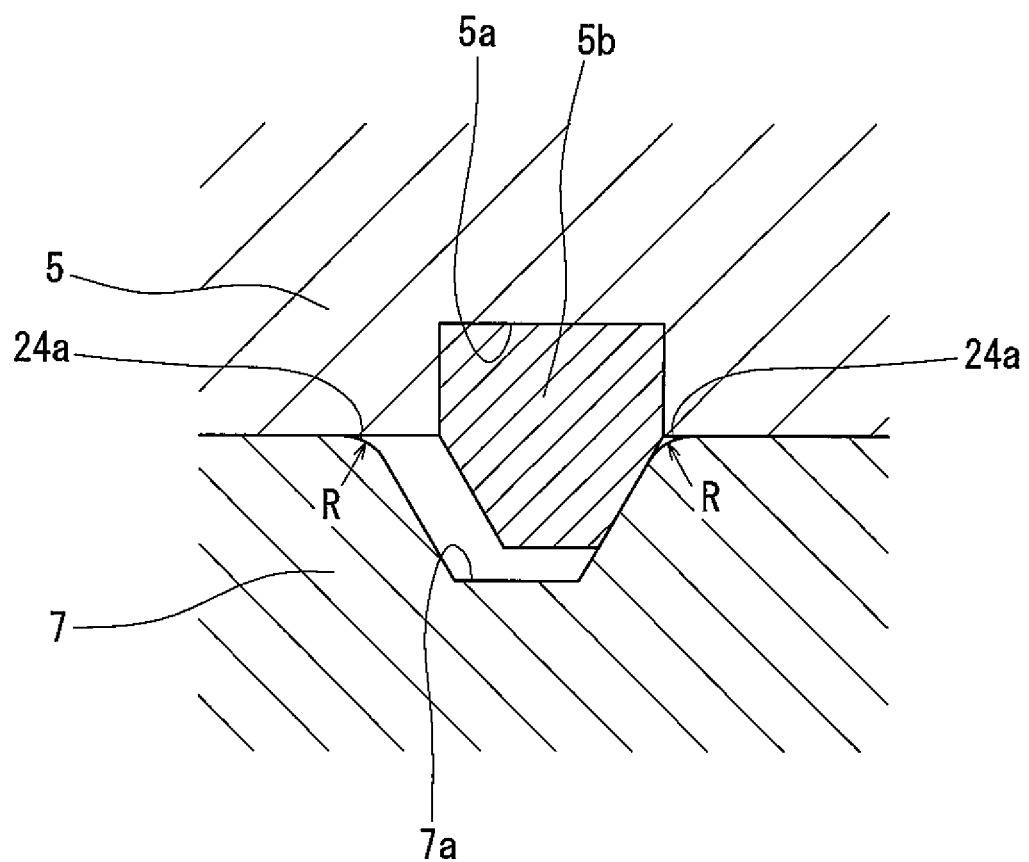
FIG. 7 is an enlarged sectional view showing the relationship between the helical rib and the helical groove.

FIG. 7 shows a helical rib 5b and a helical groove 7a that differs in shape and relative dimension. The helical groove 7a of FIG. 7 is formed with chamfers 24a along its edges, each having a single constant radius of curvature R. The chamfers 24a prevent the shoulders of the helical rib 5b of the outer ring member 5 from coming into contact with the edges of the helical groove 7a when the helical rib 5b is engaged in the helical groove 7a. The chamfers 24a also reduce the contact pressure between the edges of the helical grooves 7a of the planetary rollers 7 and the portions of the radially inner surface of the outer ring member 5 that are brought into rolling contact with the edges of the helical grooves 7a. The chamfers 24a are formed by barreling.

Figure 8A:
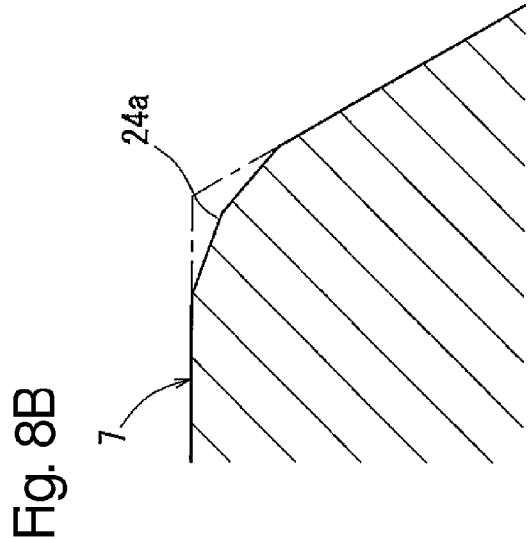
FIGS. 8A to 8D are sectional views of different chamfers.
Figure 8B:
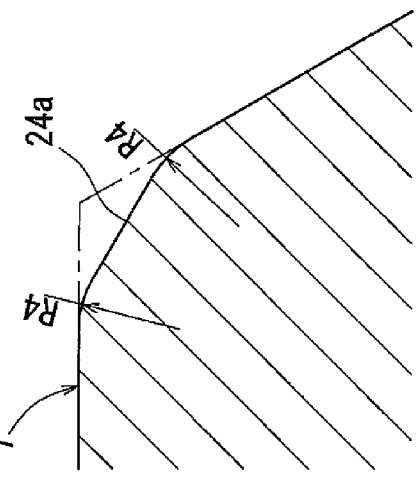
Figure 8C:
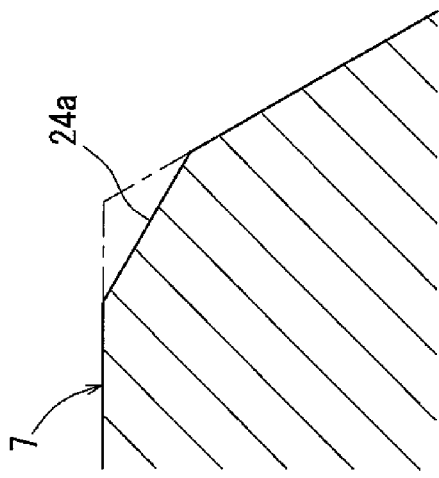
Figure 8D:
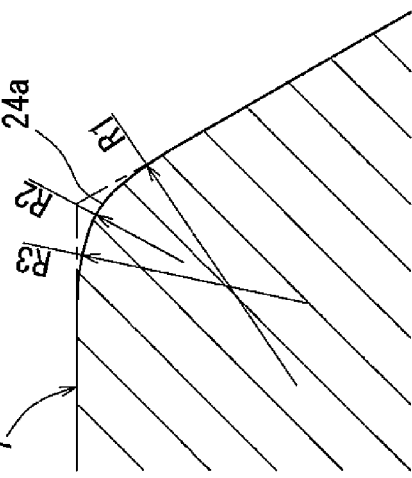

FIGS. 8A to 8D show modifications of the chamfers 24a of the helical groove 7a shown in FIG. 7, respectively. The chamfer 24a of FIG. 8A is a single straight line. The chamfer 24a of FIG. 8B consists of two straight lines. The chamfer 24a of FIG. 8C consists of three curves having different radii of curvature R1, R2 and R3, respectively. The chamfer 24a of FIG. 8D consists of a straight line and two curves both having a radius of curvature R4. These chamfers 24a are formed by barreling or cutting.

Figure 9A:
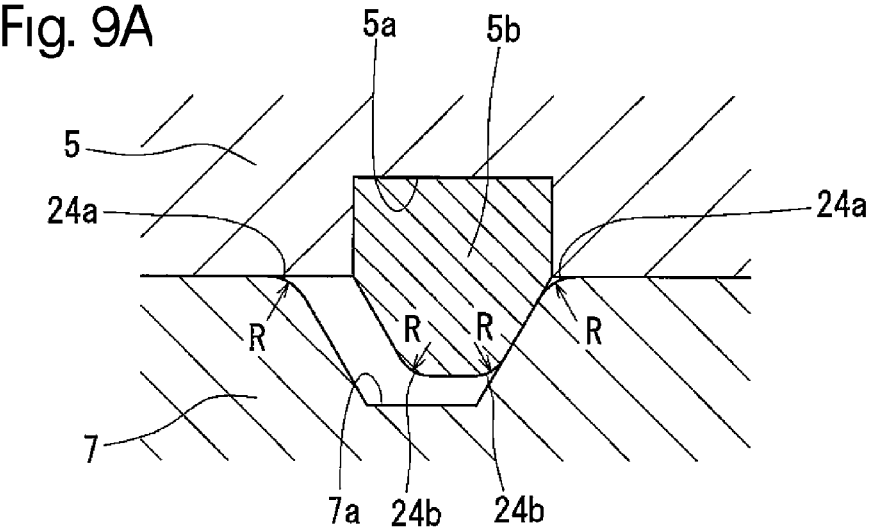
FIGS. 9A to 9C are sectional views showing the relationships between different helical ribs and helical grooves.
Figure 9B:
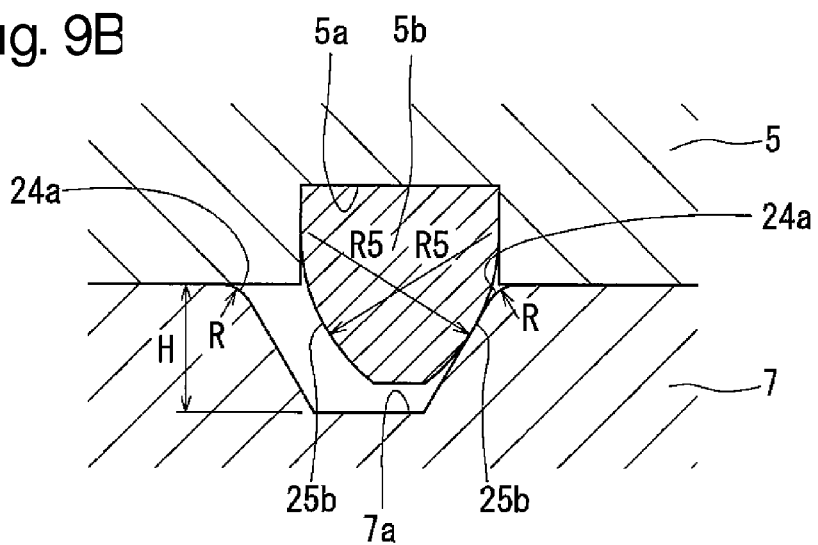
Figure 9C:
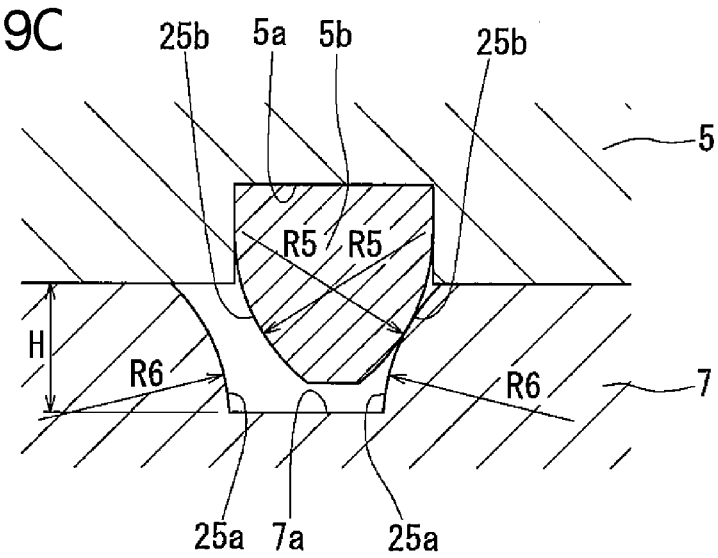

FIGS. 9A to 9C show various modifications of the helical rib 5b of the outer ring member 5 and the helical groove 7a of the planetary roller 7 shown in FIG. 7, respectively. In the modification of FIG. 9A, chamfers 24b are formed on the shoulders of the helical rib 5b too. In the modification of FIG. 9B, each of the inclined side surfaces of the helical rib 5b is an arcuate surface 25b which is convex in the direction in which the side surface is inclined, and which has a radius of curvature R5 larger than the height H of the helical rib 5b. FIG. 9C shows a modification of FIG. 9B, in which each of the inclined side walls of the helical groove 7a is also an arcuate surface 25a which is convex in the direction in which the side wall is inclined, and which has a radius of curvature R6 larger than the height H of the helical rib 5b. The respective modifications of FIGS. 9B and 9C are effective to prevent one of the inclined side surfaces of the helical rib 5b from coming into contact with the corresponding side wall of the helical groove 7a at its portion near its root or apex when the helical rib 5b is engaged in the helical groove 7a.

What is claimed is:

1. An electric linear motion actuator comprising:
   a housing;
   an outer ring member mounted in the housing and having a center axis;
   a rotary shaft extending along the center axis of the outer ring member and configured to be driven by an electric motor;
   a carrier supported rotatably about the rotary shaft for rotation relative to the rotary shaft; and
   a plurality of planetary rollers mounted between a radially outer surface of the rotary shaft and a radially inner surface of the outer ring member, the planetary rollers respectively having planetary roller axes and being rotatably supported by the carrier for rotation about the planetary roller axes, respectively, and the planetary rollers being engaged with the radially outer surface of the rotary shaft and the radially inner surface of the outer ring member, such that, upon rotation of the rotary shaft, the planetary rollers are arranged to revolve around the rotary shaft while rotating about the planetary roller axes, respectively;
   wherein the radially inner surface of the outer ring member is formed with at least one helical rib, the planetary rollers each having a radially outer surface formed with a plurality of circumferential grooves which are equal in pitch to the helical rib or formed with at least one helical groove equal in pitch to, and different in lead angle from, the helical rib, the helical rib being engaged in the circumferential grooves or the helical grooves of the respective planetary rollers, and wherein the outer ring member and the carrier are configured to be movable in the direction of said center axis relative to each other; and
   wherein the carrier is immovable in the direction of the center axis of the outer ring member, and the outer ring member is not rotatable and is fitted in a radially inner surface of the housing so as to be slidable in the direction of the center axis of the outer ring member, wherein the outer ring member acts as a linearly movable output member.

2. The electric linear motion actuator of claim 1, wherein at least one of the radially outer surface of the rotary shaft, the radially outer surface of each of the planetary rollers and the radially inner surface of the outer ring member is subjected to surface hardening treatment.

3. The electric linear motion actuator of claim 2, wherein said surface hardening treatment is hard plating treatment.

4. The electric linear motion actuator of claim 2, wherein the member or members that are subjected to surface hardening treatment are made of low carbon steel which contains carbon by 0.3% by mass or less and are subjected to carburizing treatment, or made of medium carbon steel containing carbon by more than 0.3% by mass and are subjected to hardening and tempering.

5. The electric linear motion actuator of claim 1, wherein said helical rib comprises a helical rib member fitted in a helical groove formed in the radially inner surface of the outer ring member.

6. The electric linear motion actuator of claim 1, wherein at least either the surface of said helical rib or the circumferential grooves or the helical groove on the radially outer surface of each of the planetary rollers is subjected to surface hardening treatment.

7. The electric linear motion actuator of claim 1, wherein said at least one helical rib comprises a plurality of helical ribs, and/or said at least one helical groove formed on the radially outer surface of each of the planetary rollers comprises a plurality of helical grooves.

8. The electric linear motion actuator of claim 1, wherein an equivalent lead angle α of the helical rib is 0.5° or less, where $$\alpha = \tan^{-1}\left\{\frac{D_o \cdot \tan|\alpha_o - \alpha_p|}{D_o + D_s}\right\}$$

and where $D_o$ is an inner diameter of the outer ring member, $D_s$ is an outer diameter of the rotary shaft; $\alpha_o$ is a lead angle of the helical rib, and $\alpha_p$ is a lead angle of the helical groove.

9. The electric linear motion actuator of claim 1, wherein each of the circumferential grooves or the helical groove on the radially outer surface of each of the planetary rollers has its side walls inclined such that the width of the circumferential or helical groove increases from its bottom toward opening.

10. The electric linear motion actuator of claim 9, wherein said circumferential grooves or the helical grooves of the planetary rollers have edges, and said helical rib has shoulders, and wherein chamfers are formed along at least either said edges or said shoulders.

11. The electric linear motion actuator of claim 10, wherein said chamfers each comprise a single straight line, a plurality of straight lines, a curved line having a single radius of curvature, or a combination of at least one single straight line and said curved line.

12. The electric linear motion actuator of claim 1, wherein said helical rib has side surfaces thereof inclined such that the width of the helical rib decreases from a root toward an apex of the helical rib.

13. The electric linear motion actuator of claim 12, wherein said side surfaces are inclined at an angle equal to an angle of inclination of said side walls.

14. The electric linear motion actuator of claim 12, wherein at least either said side surfaces or said side walls are curved surfaces which are convex in a direction in which the respective side surfaces or the side walls are inclined.

15. The electric linear motion actuator of claim 14, wherein the curved surfaces are arcuate surfaces.

16. The electric linear motion actuator of claim 15, wherein the arcuate surfaces have a radius of curvature larger than a height of said helical rib.

17. An electric disk brake system comprising brake pads, a brake disk, and an electric linear motion actuator for linearly driving the brake pads, thereby pressing the brake pads against the brake disk and applying a braking force to the disk, wherein said electric linear motion actuator is the electric linear motion actuator of claim 1.

18. The electric disk brake system of claim 17, further comprising support pins supported by the carrier and rotatably supporting the planetary rollers, respectively, for rotation about the planetary roller axes, respectively, relative to the carrier, said support pins being carried by the carrier such that rotation of the carrier about the center axis causes the revolving of the planetary rollers about the rotary shaft.

19. The electric linear motion actuator of claim 1, further comprising support pins supported by the carrier and rotatably supporting the planetary rollers, respectively, for rotation about the planetary roller axes, respectively, relative to the carrier, said support pins being carried by the carrier such that rotation of the carrier about the center axis causes the revolving of the planetary rollers about the rotary shaft.

* * * * *